Dec. 6, 1955   O. R. KASTEN   2,726,107
AUTOMATIC TAKE-UP FOR PIVOT PIN CONNECTIONS
Filed Dec. 21, 1953

Oscar R. Kasten,
Inventor.
Koenig and Pope,
Attorneys.

United States Patent Office 2,726,107
Patented Dec. 6, 1955

2,726,107

AUTOMATIC TAKE-UP FOR PIVOT PIN CONNECTIONS

Oscar R. Kasten, Altenburg, Mo.

Application December 21, 1953, Serial No. 399,394

3 Claims. (Cl. 287—100)

This invention relates to a take-up for a pivot pin connection for the purpose of eliminating end play in the connection such as may be caused by wear of its parts, and more particularly to a take-up of this class for use in conjunction with a pivot pin connection in the steering linkage of an automotive vehicle.

Among the several objects of the invention may be noted the provision of an improved take-up of the class described adapted to eliminate end play in the pivot pin connection without imposing any serious amount of friction thereon; the provision of a take-up of this class which, as installed on a pivot pin connection of the steering linkage of an automotive vehicle, eliminates excessive clearance in the connection thereby to reduce tire wear, improves the driver's control over the vehicle, and eliminates excessive movement at the steering wheel; the provision of a take-up such as described, which, once installed, does not require any further adjustment to compensate for subsequent wear; and the provision of a take-up having these advantages which is economical to manufacture and easy to install. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, Fig. 1 is a plan of a typical pivot pin connection in a typical steering linkage of an automotive vehicle equipped with a take-up of this invention, parts being broken away;

Corresponding reference characters indicate corresponding parts throughout the several views of the drawings.

Figure 1:
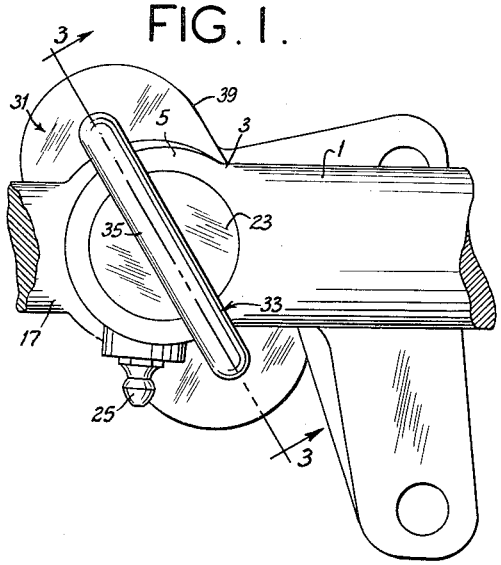
Figure 2:
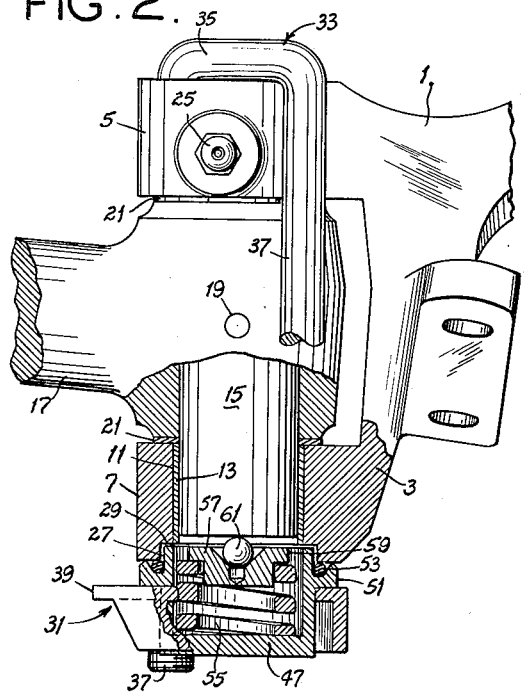
Fig. 2 is a front elevation of Fig. 1 with parts broken away and shown in section.
Figure 3:
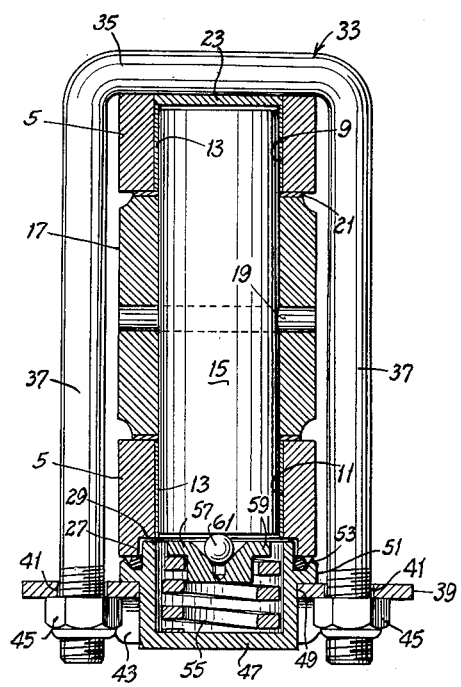
Fig. 3 is a vertical section taken on line 3—3 of Fig. 1.
Figure 4:
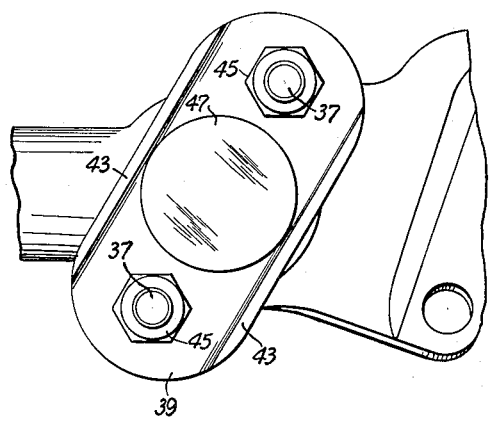
Fig. 4 is a bottom plan of Fig. 2.

Referring to the drawings, there is shown at 1 the so-called steering idler third arm bracket of the steering linkage of a conventional automotive vehicle. The bracket has a yoke 3. The upper arm of the yoke is designated 5 and the lower arm of the yoke is designated 7. These arms have aligned openings 9 and 11, respectively. Each of these openings is provided with a bushing 13. A pivot pin 15 at the end of the steering idler arm 17 of the steering linkage has its ends rotary in the bushings. The pivot pin 15 is pinned in the end of the third arm 17 as indicated at 19. Washers 21 are interposed between the third arm 17 and the arms 5 and 7 of the yoke 3 and, before they wear, take up clearance between the arm 17 and the inner sides of arms 5 and 7. A closure for the upper end of the opening 9 is indicated at 23. A lubricant fitting is shown at 25 on the upper arm 5, and it will be understood that there is a similar fitting on the lower arm 7. The lower arm 7 has a counterbore 27 in its bottom providing an outwardly facing internal annular shoulder 29. All these elements are conventional elements of a steering linkage of a certain class of automotive vehicles.

Reference character 31 generally designates a take-up of this invention for eliminating end play of the pin 15 in the yoke 3 such as develops upon wear of the washers 21 (with resultant development of increased clearance between the arm 17 and the inner sides of arms 5 and 7 of the yoke 3). It will be understood that such end play is undesirable in that it contributes toward excessive wear of the tires of the vehicle, poorer control over the vehicle, and excessive movement of the steering wheel of the vehicle. The take-up 31 comprises a U-bolt 33 adapted to straddle the yoke 3 in inverted position as shown in the drawings. The head end of the U-bolt is designated 35 and its side arms are designated 37. A crosshead 39 is slidable on the arms 37 of the bolt, the arms extending loosely through openings 41 in the crosshead. The latter is shown as having reinforcing side flanges 43. Nuts 45 are threaded on the free ends of the side arms 37 of the bolt outward of the crosshead. These retain the crosshead on the bolt, and are adapted to be threaded inward to move the crosshead toward the head end 35 of the bolt.

The head carries a spring housing 47 in the form of a cup mounted in upwardly open position in an opening 49 in the crosshead, having an external flange 51 below its rim bearing against the upper or inside face of the crosshead around the opening 49. The rim of the cup is adapted to be received in the counterbore 27. The flange 51 of the cup is grooved to accommodate a packing ring 53 adapted to engage the bottom of the lower arm 7 of the yoke 3 around the counterbore 27. In the cup is a coil compression spring 55. This extends from the bottom of the cup toward the head end 35 of the bolt. Carried on the inner or upper end of the spring 55 (its end toward the head end of the bolt) is a ball seat 57. This seat, preferably made of hardened steel or the like, has a flange 59 providing a shoulder for engagement by the upper end of the spring and an upwardly opening conical socket 59 accommodating a ball 61. The diameter of the ball is so related to the conical form of the socket 59 that the ball projects upward from the inside face of the seat for engagement with the lower end of the pivot pin 15.

In installing the take-up 31, the U-bolt 33 is applied to straddle the yoke 3 as shown. Nuts 45 are turned to draw the crosshead 39 toward the head end 35 of the bolt to the point where the flange 51 engages the bottom of the lower arm 7 of the yoke 3. This effects compresion of the packing ring 53 between the flange and the bottom of the arm 7. It also brings the ball 61 into engagement with the lower end of the pivot pin 15 and compresses the spring 55. The spring thereupon acts through the ball to bias the pin 15 upward to take out any end play such as may occur by reason of wear of the washers 21. The force of the spring acting through the ball on the pivot pin 15 is taken by the reaction of the upper washer 21 against the inside of the upper arm 5 of the yoke. Once the take-up device is installed as described, this bias is maintained to eliminate end play despite further wear of the washers. It will also be observed that since the force of the spring is transmitted to the pin 15 through the ball 61, and since the friction of the ball is minor, the friction imposed by the use of the take-up device upon the pin is negligible.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A take-up for eliminating end play from a pivot pin connection, comprising a U-bolt adapted to straddle the connection, a crosshead slidable on the side arms of the bolt, nuts threaded on the free ends of the side arms of the bolt outward of the crosshead, a cup received in an opening in the crosshead between the side arms of the bolt having a flange below its rim bearing against the inner face of the crosshead, the cup being open toward the head end of the bolt, a compression spring in the cup, a ball seat on the inner end of the spring, and a ball carried by the seat projecting from the inside face of the seat for engagement with an end of the pivot pin of said connection.

2. A take-up as set forth in claim 1 wherein the ball is received in a conical socket in the seat.

3. A take-up for eliminating end play from a pivot pin connection, comprising a U-bolt adapted to straddle the connection, a crosshead slidable on the side arms of the bolt, nuts threaded on the free ends of the side arms of the bolt outward of the crosshead, a cup received in an opening in the crosshead between the side arms of the bolt having a flange below its rim bearing against the inner face of the crosshead, the cup being open toward the head end of the bolt, a compression spring in the cup, a ball seat on the inner end of the spring, and a ball carried by the seat projecting from the inside face of the seat for engagement with an end of the pivot pin of said connection, the flange of the cup being grooved, and a packing ring carried in the groove.

References Cited in the file of this patent

UNITED STATES PATENTS

| | | |
|---|---|---|
| 220,696 | Blue | Oct. 21, 1879 |
| 549,801 | Lockwood | Nov. 12, 1895 |
| 1,418,005 | Locke | May 30, 1922 |
| 1,493,311 | Woolson | May 6, 1924 |
| 1,899,555 | Campbell | Feb. 28, 1933 |
| 2,620,202 | Coleman | Dec. 2, 1952 |